Patented July 2, 1940

2,206,171

UNITED STATES PATENT OFFICE 2,206,171

UNSATURATED ACID GLYCOL RESIN COMPLEX AND PROCESS OF MAKING SAME

Carleton Ellis, Montclair, N. J., assignor to Ellis-Foster Company, a corporation of New Jersey No Drawing. Application May 21, 1936,
Serial No. 81,027

11 Claims. (Cl. 260—22)

This invention relates to resinous products or compositions and to the process of making same, and relates especially to resinous compositions containing the product of reaction of a polyhydric alcohol (particularly a glycol), an unsaturated polybasic acid and oily material comprising drying or semi-drying oils and/or the fatty acids obtained therefrom by hydrolysis.

This is a continuation in part of my co-pending application Serial No. 61,839, filed October 10, 1925, now Patent No. 2,072,068, wherein is described the resinified glycerides of water-soluble crystallizable polybasic acids and oily acids more unsaturated than oleic. Such resinous products in contact with air are converted to an insoluble-infusible form; that is, they dry through the agency of oxidation and may be said to be oxygen-convertible. It has generally been considered essential in obtaining a product capable of undergoing this conversion that the polyhydric alcohol be glycerol or one containing more than three hydroxyl groups, the complex alcohol in conjunction with the unsaturated oily acid assisting in the building up of the final insoluble form of the resin. For example, the mono-hydric alcohol esters, as well as dihydric alcohol esters, of drying oil acids are incapable of drying to insoluble films whether or not a polybasic acid such as phthalic is included to form a mixed ester.

The present invention concerns resinous compositions containing dihydric alcohols as the polyhydric alcohol constituent, said products being capable of drying under appropriate conditions to insoluble films. This condition of convertibility results from the employment of unsaturated polybasic acids. A considerable number of glycols are available, such as ethylene or propylene glycol and various other glycols reactive with numerous organic acids or mixtures of organic acids to yield a multiplicity of resins. The glycol resins as a rule are softer than the glyceride resins and are, therefore, in many cases better adapted for application where high flexibility is desired. The present invention contemplates the employment of various glycol derivatives of a generally equivalent character for the purpose specified herein and particularly the glycol ethers, such as diethylene glycol, triethylene glycol, and the like.

As the unsaturated polybasic acid component to secure the element-convertible product of the present invention I prefer to use an acid of the maleic type. The term maleic polyester is used herein to cover the polyesters of all polybasic acids equivalent to maleic in the respect of forming polymerized glycol esters of the infusible-insoluble type. Such acids contain a double bond in the α-position. Besides maleic acid or anhydride there are included acids such as fumaric, itaconic, citraconic and the like and mixtures of these; also acids which yield such compounds during reaction, such as citric and malic.

The acids of drying and semi-drying oils appropriate for inclusion in the maleic polyesters include those from linseed, perilla, soya bean, hempseed, walnut and sunflower oil and the like. Acids having anomalous behavior from the standpoint of the present invention include those from tung and oiticica oil, as well as dehydrated castor oil acids. The acids obtained by hydrolysis of a drying oil comprise mixtures of acids. The pure fatty acids can be used when available.

In general the process of making the maleic polyesters herein contemplated consists in heating at reaction temperature a mixture of all the constituents until the requisite degree of resinification is attained as determined, for example, by the consistency of the reaction mixture or by the acid number. Also the reaction may be carried out in more than one step. For example, a maleic glycol ester may be heated with the drying oil acids or a glycol-drying oil acids reaction product may be heated with the maleic acid material.

The drying oils themselves are more difficult to incorporate than drying oil acids. However, these oils may be utilized along with a blending agent (preferably high boiling) which is a solvent for all the reactants. A mixture of oil and oil acids may be used. Another method of incorporating the drying oils consists in preliminarily heating the oil with the glycol (or another polyhydric alcohol if preferred) until re-esterification or alcoholysis has occurred with formation of drying oil acid esters containing hydroxyl groups, the heating preferably being carried out in the presence of an alcoholysis catalyst, such as a small amount of an alkali or a basic salt. This step is followed by addition of the polybasic unsaturated acid and continued heating.

The following will serve as examples to illustrate the element-convertible resins of this invention and the manner in which they are prepared, but it is to be understood that these examples are set forth merely for illustrative purposes and that various modifications may be made which will depart in one way or another from the specific course provided by the examples and that such modifications are considered to be within the confines of the present invention.

*Example 1.*—Diethylene glycol (120 parts), maleic anhydride (100 parts) and linseed oil fatty acids (50 parts) were gradually heated for 4 hours to 200° C. in an inert atmosphere. At first the fatty acids formed a separate phase but later blended to form a homogeneous mass of light yellow color. A solution of the resin to which driers were added formed a hard tough film on short baking. Films containing driers also air-dried in sunlight in from 3 to 4 hours.

This resin contains a relatively low proportion of drying oil acid. To compare the properties of a phthalic acid resin containing the same amount of drying oil acids the following resin was made. Diethylene glycol (120 parts), phthalic anhydride (148 parts), and linseed oil acids (50 parts) were heated under the same conditions. Films of the maleic resin and the phthalic resin (containing driers) were baked for the same length of time at 100° C. Panels were placed in a vertical position and most of the phthalic resin ran off during baking. The maleic resin dried to a clear film. Also when films of the two resins were allowed to air-dry for 2 days in absence of direct sunlight, the maleic resin had only a slight tackiness and was dry after exposing the film subsequently to sunlight for 1 hour. The phthalic resin was still wet after 2 days and did not dry when the film was subsequently exposed to sunlight for an hour.

*Example 2.*—Diethylene glycol (84.8 parts), maleic acid (46.4 parts) and linseed oil acids (56.4 parts) were mixed and heated in an open vessel. The mixture became homogeneous at about 170° C. and the temperature was taken to 240° C. and held for ½ hour. The product was a light amber, sticky, clear mass, whose solutions containing driers hardened at ordinary temperatures to tough, clear, smooth films.

*Example 3.*—Triethylene glycol (88 parts), maleic acid (46 parts) and soya bean oil acids (28 parts) were mixed and heated. Clearing took place at 160°–180° C. The melt was maintained for 10 minutes at 240° C. The resinous product was light amber in color and soluble in toluol.

*Example 4.*—Diethylene glycol (64 parts), maleic acid (46 parts), linseed oil (10 parts) and linseed oil acids (56 parts) were heated together. The mixture became homogeneous at about 190° C. and, when heated at 240° C. for 10 minutes, formed a light-colored, sticky resinous mass which was soluble in toluol. Addition of lead-cobalt naphthenate to the solution caused a film of the material to air-dry forming a tough flexible light colored coating.

*Example 5.*—Triethylene glycol (90 parts) and fumaric acid (24 parts) were heated together until the melt was clear; that is, to 170°–175° C. Soya bean oil acids (56 parts) were added and the mixture was heated to 200° C. and held at this point for an hour. A certain amount of sediment was present and the clear, brown, viscous reaction product was poured off.

The products of this invention are light colored and range in consistency from very viscous liquids to firm solids. They are soluble in such solvents as coal-tar hydrocarbons, esters, acetone and dioxan. If the drying oil modifier is present in high proportion adequate solubility in mineral spirits results. The solutions (preferably with inclusion of soluble driers such as are used with drying oils) are capable of drying to light-colored tough films. Coatings may be hardened by baking, if desired. The resins may be used for impregnating cloth to form flexible oilcloth. Adhesion to most surfaces is very pronounced. Coatings adhere to metals very tenaciously, which suggests their use as primers and coatings for sheet metal. The products can also be used as cements and subsequently hardened. For example, pieces of earthenware and the like can be joined, or glass plates can be stuck together to form safety glass, the resin being used alone or mixed with compatible cellulose derivatives, or as a cement to join cellulose ester sheets to glass. Adhesion is only slight to amalgamated tin or to greasy surfaces. The resins are compatible with cellulose esters and ethers and may be used in lacquers.

Enamels formed by grinding pigments with the resin solution are color-stable. A white enamel can be produced by means of lithopone or titanox which retains its color and film flexibility over a long period, shows relatively high resistance to chalking and is unaffected by moisture. This suggests the formulation of paints for outside exposure (e. g., house paints) which possess high durability.

In the above, the condition of convertibility of glycol polyesters is provided by maleic in conjunction with drying oil acids. Another aspect of this invention resides in replacing the drying oil acids by monobasic acids which do not absorb oxygen; for example, oleic, stearic, palmitic, ricinoleic, benzoic and the like. In this respect maleic acid is utilized in its capacity of providing loci of polymerization and comprising the sole conferrer of element-convertibility to the glycol resin.

What I claim is:

1. A soluble resinous material capable of being converted to the infusible, insoluble state by oxidation comprising the reaction product of a glycol, an α-unsaturated dibasic carboxylic acid and the mixed fatty acids derived from a drying oil.

2. A soluble resinous material capable of being converted to the infusible, insoluble state by oxidation comprising the reaction product of a glycol, maleic acid and the mixed fatty acids derived from a drying oil.

3. A soluble resinous material capable of being converted to the infusible, insoluble state by oxidation comprising the reaction product of a glycol, fumaric acid and the mixed fatty acids derived from a drying oil.

4. A soluble resinous material capable of being converted to the infusible, insoluble state by oxidation comprising the reaction product of a glycol, an α-unsaturated dibasic carboxylic acid and linseed oil fatty acids.

5. A soluble resinous material capable of being converted to the infusible, insoluble state by oxidation comprising the reaction product of diethylene glycol, maleic acid and linseed oil fatty acids.

6. The process of making a soluble resinous product which comprises heating at reaction temperature a mixture of a glycol, an α-unsaturated dibasic carboxylic acid and fatty acids derived from an oil having drying properties, said product being capable of being converted to the insoluble, infusible state by oxidation.

7. The process of making a soluble oxygen-convertible resinous product which comprises heating at reaction temperature a mixture of a glycol, maleic acid and the mixed fatty acids derived from a drying oil.

8. The process of making a soluble oxygen-convertible resinous product which comprises heating at reaction temperature a mixture of a glycol, maleic acid and linseed oil fatty acids.

9. The process of making a soluble oxygen-convertible resinous product which comprises heating at reaction temperature a mixture of diethylene glycol, maleic acid and linseed oil fatty acids.

10. A soluble resinous material capable of being converted to the infusible, insoluble state comprising the reaction product of a glycol ether, an alpha-unsaturated dibasic carboxylic acid, and a monobasic organic carboxylic acid.

11. A soluble resinous material capable of being converted to the infusible, insoluble state comprising the reaction product of a glycol, an alpha-unsaturated dibasic carboxylic acid, and a monobasic organic carboxylic acid.

CARLETON ELLIS.